(12) United States Patent
Li

(10) Patent No.: US 10,951,808 B2
(45) Date of Patent: Mar. 16, 2021

(54) METHOD FOR FOCUSING CONTROL, MOBILE TERMINAL AND NON-TRANSITORY STORAGE MEDIUM

(71) Applicant: GUANGDONG OPPO MOBILE TELECOMMUNICATIONS CORP., LTD., Guangdong (CN)

(72) Inventor: Xiaopeng Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/714,507

(22) Filed: Dec. 13, 2019

(65) Prior Publication Data
US 2020/0120263 A1   Apr. 16, 2020

Related U.S. Application Data

(63) Continuation of application No. PCT/CN2018/090624, filed on Jun. 11, 2018.

(30) Foreign Application Priority Data

Jun. 16, 2017 (CN) .......................... 201710458412.3

(51) Int. Cl.
*H04N 5/232* (2006.01)

(52) U.S. Cl.
CPC ..... *H04N 5/23212* (2013.01); *H04N 5/23216* (2013.01); *H04N 5/23219* (2013.01)

(58) Field of Classification Search
CPC ........... H04N 5/23212; H04N 5/23219; H04N 5/23216; H04N 5/23218; H04N 5/2258;
(Continued)

(56) References Cited

U.S. PATENT DOCUMENTS 7,801,432 B2 * 9/2010 Kumagai ........... H04N 5/23219
396/79
7,864,240 B2 * 1/2011 Ide ..................... H04N 5/23212
348/347

(Continued)

FOREIGN PATENT DOCUMENTS

CN        1716078 A     1/2006
CN      101086598 A    12/2007

(Continued)

OTHER PUBLICATIONS

European Search Report and Written Opinion for related European application No. 18817466.8, dated Apr. 17, 2020 (7 pages).

(Continued)

*Primary Examiner* — Pritham D Prabhakher

(57) ABSTRACT

A method for focus control and a mobile terminal are disclosed. The method includes recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and focusing on the face region following the movement between the first position and the second position along the optical axis according to the preset travel path.

18 Claims, 4 Drawing Sheets

(58) Field of Classification Search
CPC ....... H04N 5/232123; H04N 5/232127; H04N 5/2351; H04N 5/232945; H04N 9/04557; G03B 13/36; G03B 13/32; G03B 13/20; G03B 19/07; G06K 9/00255
USPC .................................................. 348/208.12
See application file for complete search history.

(56) References Cited

U.S. PATENT DOCUMENTS

| | | | | |
|---|---|---|---|---|
| 8,059,186 | B2* | 11/2011 | Nakahara | H04N 5/23212 348/345 |
| 8,213,786 | B2* | 7/2012 | Song | H04N 5/23212 396/121 |
| 8,284,261 | B2* | 10/2012 | Mizuo | G03B 13/20 348/208.12 |
| 9,706,108 | B2* | 7/2017 | Takahashi | H04N 5/23222 |
| 10,148,945 | B1* | 12/2018 | Malaescu | H04N 5/23212 |
| 2004/0227693 | A1* | 11/2004 | Rambo | H04N 7/144 345/6 |
| 2008/0136958 | A1 | 6/2008 | Nakahara | |
| 2008/0143865 | A1* | 6/2008 | Kimoto | H04N 5/23218 348/345 |
| 2008/0252773 | A1 | 10/2008 | Oishi | |
| 2009/0115887 | A1* | 5/2009 | Sugimoto | H04N 5/23218 348/349 |
| 2009/0116830 | A1* | 5/2009 | Kumagai | H04N 5/23219 396/125 |
| 2009/0135291 | A1* | 5/2009 | Sugimoto | H04N 5/232123 348/347 |
| 2009/0256953 | A1 | 10/2009 | Yasuda | |
| 2010/0026836 | A1* | 2/2010 | Sugimoto | G06K 9/00697 348/223.1 |
| 2011/0058097 | A1 | 3/2011 | Mizuo | |
| 2011/0150446 | A1 | 6/2011 | Song | |
| 2018/0343444 | A1* | 11/2018 | Malaescu | G06T 7/80 |

FOREIGN PATENT DOCUMENTS

| | | |
|---|---|---|
| CN | 101086604 A | 12/2007 |
| CN | 101452181 A | 6/2009 |
| CN | 101674403 A | 3/2010 |
| CN | 103905729 A | 7/2014 |
| CN | 105657276 A | 6/2016 |
| CN | 105812652 A | 7/2016 |
| CN | 106375671 A | 2/2017 |
| CN | 107172352 A | 9/2017 |
| EP | 1845412 A2 | 10/2007 |
| EP | 3119078 A2 | 1/2017 |

OTHER PUBLICATIONS

International search report, PCT/CN2018/090624, dated Aug. 31, 2018 (3 pages).
English translation of First Office Action from China patent office in a counterpart Chinese patent Application 201710458412.3, dated Mar. 26, 2019 (8 pages).
English translation of Second Office Action from China patent office in a counterpart Chinese patent Application 201710458412.3, dated Nov. 1, 2019 (7 pages).
European examination report, European application No. 18817466.8, dated Dec. 15, 2020 (4 pages).

* cited by examiner

METHOD FOR FOCUSING CONTROL, MOBILE TERMINAL AND NON-TRANSITORY STORAGE MEDIUM

CROSS-REFERENCE TO RELATED APPLICATION(S)

This application is a continuation application of International Patent Application No. PCT/CN2018/090624, filed on Jun. 11, 2018, which claims priority to Chinese Patent Application No. 201710458412.3, filed on Jun. 16, 2017, the contents of both of which are herein incorporated by reference in their entireties.

TECHNICAL FIELD

The present disclosure generally relates to the technical field of computer, and specifically to a method for focusing control, a mobile terminal, and a non-transitory storage medium.

BACKGROUND

With development of the ever-changing technology of mobile terminals, the photograph function of a mobile terminal is used more and more frequently, and there are more and more photos of people. There are lots of people taking group photos and selfies at shopping malls, scenic spots, places of interest and historical sites. Therefore, the photograph of the mobile terminal currently supports the face focusing function. The face focusing means that the focusing is mainly triggered by the detected area of the face, which means that the face is the best clear point to achieve focus photography.

However, when the object is farther away from the mobile terminal (two to three meters), the face region detected by the mobile terminal will be small, and the focus area will be correspondingly small. During the focusing, the Focus Value (FV) calculated in the focus area will be flat without strong downward trend. During the search-focus, an extreme point of the focus point cannot be determined, and the motor drives the lens to move to the far focus position which means that a position corresponding to the infinity is focused. Thus, the object cannot be accurately focused, making it blurred and unclear.

SUMMARY

According to one aspect of the present disclosure, a method for focusing control, including recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and focusing on the face region following the movement between the first position and the second position along the optical axis according to the preset travel path.

According to another aspect of the present disclosure, a mobile terminal is also provided, which includes a non-transitory memory storing one or more programs a processor, and an imaging device, wherein the imaging device includes a lens and a motor configured to drive the lens to move between a near focus position and a far focus position along an optical axis to achieve a focus function, and wherein the one or more programs are configured to be executed by the processor to perform a method for focusing control, and the method for focus control includes recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and controlling the motor to drive the lens to move between the first position and the second position along the optical axis according to the preset travel path to focus on the face region.

According to yet another aspect of the present disclosure, a non-transitory storage medium is also provided, which stores one or more programs, when executed by a processor, causing the processor to perform a method for focusing control, wherein the method for focusing control includes recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and focusing on the face region following the movement between the first position and the second position along the optical axis according to the preset travel path.

BRIEF DESCRIPTION OF DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
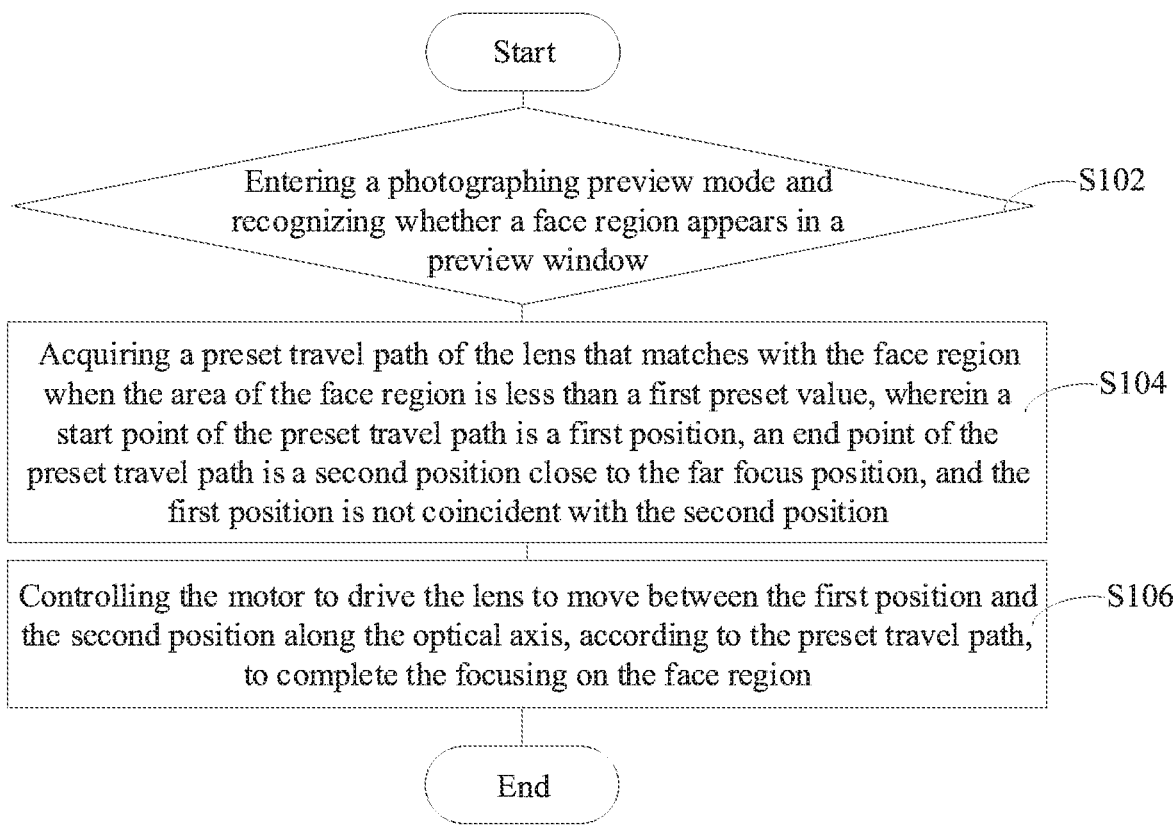
FIG. 1 is a flow chart of a method for focusing control according to some embodiments.

In order to make objects, technical solutions, and advantages of the present disclosure clearer, the present disclosure is further described in detail with the accompanying drawings and the following embodiments. It is understood that the specific embodiments described herein are merely illustrative of the present disclosure, and not intended to limit the present disclosure.

It will be understood that the terms "first", "second" and the like, as used herein, may be used to describe various elements, but these elements are not limited by these terms. These terms are only used to distinguish one element from another. By way of example, without departing from the scope of the present disclosure, the first determination unit is a second determination unit, and similarly, a second determination unit can be called as a first determination unit. Both the first determination unit and the second determination unit are determination units.

A method for focusing control is provided, including recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and focusing on the face region following the movement between the first position and the second position along the optical axis according to the preset travel path.

In some embodiments, the method further includes acquiring a number of pixels contained in the face region; determining whether the number of pixels is less than a second preset value; and determining the area of the face region is less than the first preset value in response to the number of pixels being less than the second preset value.

In some embodiments, the method further includes acquiring a default travel path in response to the face region not appearing in the preview window, wherein a start point of the default travel path is the near focus position and an end point of the default travel path is the far focus position; and focusing on another object in the preview window following the movement between the near focus position and the far focus position according to the default travel path.

In some embodiments, the default travel path is prestored and input by a user.

In some embodiments, a distance between the first position and the near focus position is within a predetermined range, wherein the predetermined range is greater than or equal to zero.

In some embodiments, the preset travel path is prestored and input by a user.

In some embodiments, a linear distance of the preset travel path is a distance between the first position and the second position.

In some embodiments, a displacement of the lens is zero in response to the lens being located at the near focus position; and the imaging device is enabled to focus on a region having a distance of 5 meters or more from the lens in response to the lens being located at the far focus position.

In some embodiments, whether the face region appears in the preview window is recognized by a preset face recognition algorithm.

In some embodiments, the preset face recognition algorithm includes one of a geometric-feature-based manner, a local feature analysis manner, an eigenface manner, an elastic-model-based manner, and a neural network manner.

In some embodiments, the face region is a to-be-processed region which is outlined in a box, a circle, an ellipse, or an irregular polygon in a processed image In some embodiments, a Contrast Detection Auto Focus (CDAF) is used to complete the focusing on the face region.

A mobile terminal is also provided, which includes a non-transitory memory storing one or more programs a processor, and an imaging device, wherein the imaging device includes a lens and a motor configured to drive the lens to move between a near focus position and a far focus position along an optical axis to achieve a focus function, and wherein the one or more programs are configured to be executed by the processor to perform a method for focusing control for controlling the imaging device, and the method includes recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and controlling the motor to drive the lens to move between the first position and the second position along the optical axis according to the preset travel path to focus on the face region.

In some embodiments, when a number of pixels contained in the face region is less than a second preset value, the area of the face region is less than the first preset value.

In some embodiments, the motor is controlled to drive the lens to move according to a default travel path to complete the focusing function when the preview window does not have the face region, wherein a starting point of the default travel path is the near focus position and an end point of the default travel path is the far focus position.

In some embodiments, a distance between the first position and the near focus position is within a predetermined range, wherein the predetermined range is greater than or equal to zero.

In some embodiments, a displacement of the lens is zero in response to the lens being located at the near focus position; the imaging device has an ability to focus on a region having a distance of 5 meters or more from the lens in response to the lens being located at the far focus position.

In some embodiments, whether the preview window has the face region is recognized by a preset face recognition algorithm, and the preset face recognition algorithm includes one of a geometric-feature-based manner, a local feature analysis manner, an eigenface manner, an elastic-model-based manner, and a neural network manner.

In some embodiments, a Contrast Detection Auto Focus (CDAF) is used to complete the focusing function on the face region.

A non-transitory storage medium is also provided, which stores one or more programs, when executed by a processor, causing the processor to perform a method for focusing control for controlling an imaging device, the imaging device including a lens and a motor configured for driving the lens to move between a near focus position and a far focus position along an optical axis to achieve a focusing, wherein the method includes recognizing whether a face region appears in a preview window in a photographing preview mode; acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and focusing on the face region following the movement between the first position and the second position along the optical axis according to the preset travel path.

FIG. 1 is a flow chart of a method for focusing control according to some embodiments. In the embodiments of the present disclosure, a method for focusing control is provided, including actions/operation in the following blocks.

At block 102, the method enters a photographing preview mode and recognizes whether a face region appears in a preview window.

It should be noted that the method for focusing control according to embodiments of the present disclosure is implemented in a scenario where a photographing is performed in a mobile terminal. An imaging device of the mobile terminal is activated when the user wants to take a photograph. The imaging device includes a lens and a motor for driving the lens to move between a near focus position and a far focus position along an optical axis to achieve a focusing. In an initial state, the lens is at the near focus position, which means that a displacement of the lens is 0. During the focusing, the farthest position (relative to the near focus position) at which the motor drives the lens to move is the far focus position. When the lens is at the far focus position, a region having a distance of 5 meters or more can from the lens of the imaging device be focused by the imaging device. The imaging device can be a front camera, a rear camera, a dual camera, and the like.

The imaging device of the mobile terminal is activated and then enters the photographing preview mode, and a preset face recognition algorithm is used to recognize whether a face region exists in the preview window. For example, a geometric-feature-based manner, a local feature analysis manner, an eigenface (Eigenface or PCA) manner, an elastic-model-based manner, and a neural network (Neural Network) manner, or other manners that can recognize a face can be used.

At block 104, the method acquires a preset travel path of the lens that matches with the face region when the area of the face region is less than a first preset value, wherein a start point of the preset travel path is a first position, an end point of the preset travel path is a second position close to the far focus position, and the first position is not coincident with the second position.

With the face recognition algorithm, the face region is recognized to be in the preview window. The face region is a to-be-processed region which is outlined in a box, a circle, an ellipse, or an irregular polygon in a processed image in the machine vision and image processing. In a machine vision software such as Halcon, OpenCV, and Matlab, various operators and functions are commonly used to obtain the face region (which is also called ROI), and then a next processing of the image will be performed.

Specifically, in embodiments of the present disclosure, the face region is a to-be-processed region which is outlined in a box in the processed image.

Since the face region is the to-be-processed region which is outlined in a box in the processed image, the area of the face region and the first preset value may be compared. When the area of the face region is less than the first preset value, the preset travel path of the lens that matches with the face region is acquired, wherein a start point of the preset travel path is the first position, an end point of the preset travel path is the second position close to the far focus position, and the first position is not coincident with the second position. It can be understood that the linear distance of the preset travel path is a distance between the first position and the second position, and the second position is close to the far focus position (that is the second position has a distance from the far focus position and is not coincident with the far focus position).

In some embodiments, the preset travel path is pre-stored by the user in a corresponding configuration file. When the area of the face region that exists is less than the first preset value, the pre-stored preset travel path is directly invoked.

At block 106, the method controls the motor to drive the lens to move between the first position and the second position along the optical axis, according to the preset travel path, to complete the focusing on the face region.

That is, the method focuses on the face region following the movement between the first position and the second position along the optical axis according to the preset travel path. Since the object has a distance of 2 to 3 meters away from the imaging device, the lens in the imaging device is driven to be at the far focus position. However, by the above method, when the object is 2 to 3 meters away from the imaging device, the area of the face region that exists in the preview window will be less than the first preset value. At this time, according to the acquired preset travel path, the end point of the preset travel path is set to be the second position close to the far focus position. When the lens is at the second position, the imaging device can focus on the object at about 2 to 3 meters, and the object can be accurately focused, making it clear.

Alternatively, a Contrast Detection Auto Focus (CDAF) is used for the focusing on the face region. In the CDAF, a focus position corresponding to the highest focus value of the image is searched to achieve the focusing. When the imaging device starts to focus, the lens is gradually moved, and the focus value of a focus region during the lens movement is calculated in real time according to a preset algorithm. When the focusing is performed, the focus region has the largest focus value (which means the focus region is the sharpest). The focus value (FV) is generally data for characterizing the sharpness of an image and obtained by processing the image output by the imaging device. In general, the higher the contrast of the focus region, the higher the focus value of the image.

In the above-mentioned method for focusing control, acquiring a preset travel path of the lens that matches with the face region when the area of the face region that exists is less than a first preset value; wherein a start point of the preset travel path is a first position, an end point of the preset travel path is a second position close to the far focus position, and the first position is not coincident with the second position; controlling the motor to drive the lens to move between the first position and the second position along the optical axis, according to the preset travel path, to complete the focusing on the face region. During the focusing, the end point of the travel path of the lens is set to be the second position close to the far focus position, which reduces the travel movement of the lens, avoids the lens move to the far focus position, and then achieves a clear focusing on the face region.

In some embodiments, a distance between the first position and the near focus position is within a preset range. The preset range herein starts from zero. That is, the first position may coincide with the near focus position. The first position may also be any point between the near focus position and the far focus position.

When the face region exists, an area of the face region is detected, the appropriate first position is selected according to the area of the face region, and the motor is controlled to drive the lens to move between the first position and the second position along the optical axis to complete the focusing on the face region. Thus, the travel movement of the lens can be shortened, and then the time required for the focusing is reduced, improving the user experience.

Figure 2:
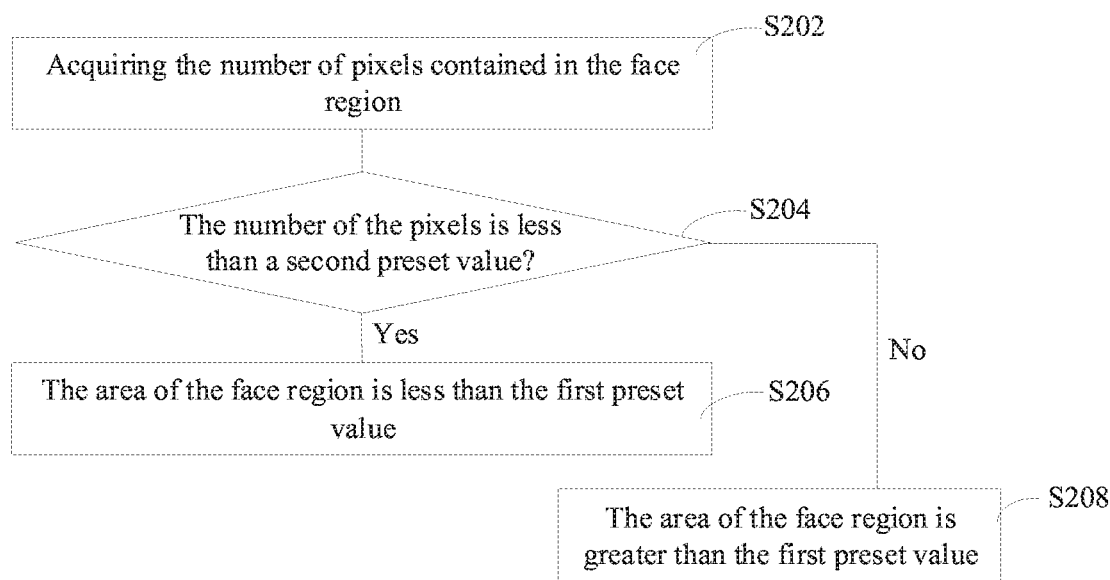
FIG. 2 is a flow chart of a determination that an area of the face region area is less than a preset value.

Referring to FIG. 2, in some embodiments, determining whether the area of the face region is less than the first preset value includes actions/operations in the following blocks.

At block 202, the method acquires the number of pixels contained in the face region.

The area of the face region can be characterized by the number of pixels contained in the face region. Specifically, when the face region is the to-be-processed region which is outlined in a box, the number of pixels in the box may be obtained, for example, 900*900, 550*550, 400*400, 350*350, 300*300, and 220*220.

At block 204, the method determines whether the number of the pixels is less than a second preset value.

The obtained number of pixels in the box is compared with the second preset value. In one embodiment, when the lens is at a certain position, the number of pixels in the box is exactly 220*220. At this time, the imaging device can just focus on an object at a position of 2 meters away from the imaging device. The second preset value can be set to 48400 (220*220). Of course, in other embodiments, it is also possible to set appropriate preset values for different imaging devices according to actual needs.

At block 206, the method indicates that the area of the face region is less than the first preset value when the number of pixels is less than the second preset value.

At block 208, the method indicates that the area of the face region is greater than the first preset value when the number of pixels is greater than the second preset value.

In some embodiments, the method for focusing control further includes the following.

The method receives a default travel path of the lens stored and input by a user, wherein a start point of the default travel path is the near focus position and an end point of the default travel path is the far focus position. The default travel path is also pre-stored by the user in a corresponding profile.

Figure 3:
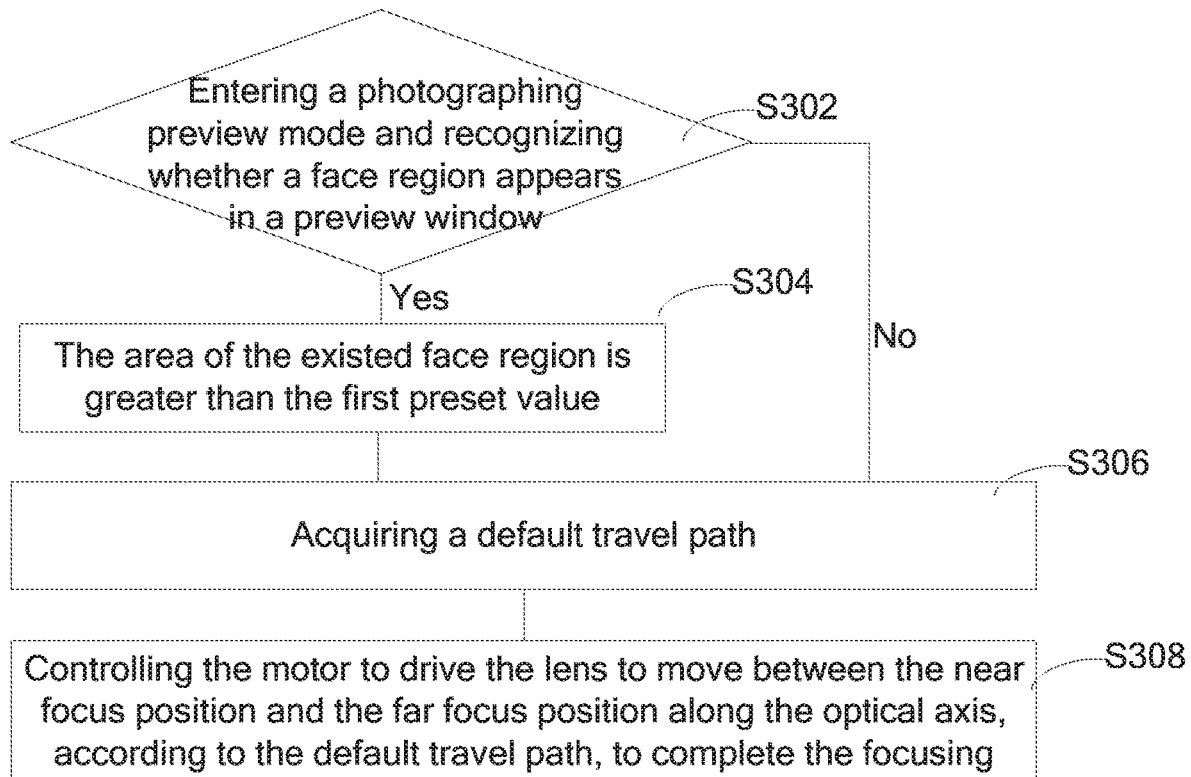
FIG. 3 is a flow chart of a method for focusing control according to another some embodiments.

Referring to FIG. 3, in some embodiments, the method for focusing control includes actions/operations in the following blocks.

At block 302, the method enters a photographing preview mode and recognizes whether a face region appears in a preview window.

In the photographing preview mode, with a face recognition algorithm, whether a face region exists in the preview window determined. When the face region exists, block 304 is performed to determine whether the area of the existed face region is greater than a preset value. When the face region does not exist in the preview window by the face recognition algorithm, block 306 is performed. At block 304, if the result of the determination is yes, that is, the area of the existed face region is greater than the preset value, block 306 is also performed.

At block 306, the method acquires a default travel path.

The default travel path may be acquired directly from the appropriate configuration file.

At block 308, the method controls the motor to drive the lens to move between the near focus position and the far focus position along the optical axis, according to the default travel path. Thus the focusing is completed on the face region when the area of the existed face region is greater than the preset value, or the focusing is completed on an object in the preview window when a face does not appear in the preview window. That is, the method focuses on the face region when the area of the existed face region is greater than the preset value, or the object in the preview window when a face does not appear in the preview window.

According to the default travel path, by using the CDAF, the motor is controlled to drive the lens to move between the near focus position and the far focus position along the optical axis to complete the focusing on the face region.

In some embodiments, a method for focusing control is configured for controlling an imaging device, wherein the imaging device includes a lens and a motor for driving the lens to move between a near focus position and a far focus position along an optical axis to achieve a focusing, the method includes the following.

Entering a photographing preview mode, and recognizing whether a face region exists in a preview window.

Acquiring a preset travel path of the lens that matches with the face region when an area of the face region is less than a preset value, wherein a start point of the preset travel path is a first position, an end point of the preset travel path is a second position close to the far focus position, and the first position is not coincident with the second position.

Controlling the motor to drive the lens to move between the first position and the second position along the optical axis according to the preset travel path to complete the focusing on the face region.

Figure 4:
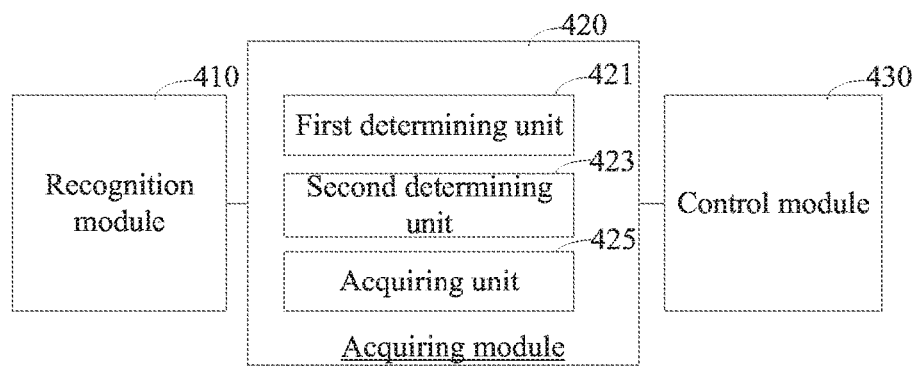
FIG. 4 is a structural block diagram of a focus control apparatus according to some embodiments.

Embodiments of the present disclosure further provide a focus control apparatus, and FIG. 4 is a structural block diagram of a focus control apparatus according to some embodiments. The focus control apparatus is configured for controlling an imaging device. The imaging device includes a lens and a motor for driving the lens to move between a near focus position and a far focus position along an optical axis to achieve a focusing. In some embodiments, the focus control apparatus includes the following.

A recognition module 410 is configured to recognize whether a face region appears in a preview window when the photographing preview mode is entered.

An acquiring module 420 is configured to acquire a preset travel path of the lens that matches with the face region when an area of the face region is less than a preset value, wherein a start point of the preset travel path is a first position, an end point of the preset travel path is a second position close to the far focus position, and the first position is not coincident with the second position.

A control module 430 is configured to control the motor to drive the lens to move between the first position and the second position along the optical axis according to the preset travel path to complete the focusing on the face region.

In the above-mentioned focus control apparatus, the acquiring module 420 acquires the preset travel path of the lens that matches with the face region when the area of the face region that exists is less than the preset value; wherein a start point of the preset travel path is a first position, an end point of the preset travel path is a second position close to the far focus position, and the first position is not coincident with the second position. The control module 430 controls the motor to drive the lens to move between the first position and the second position along the optical axis, according to the preset travel path, to complete the focusing on the face region. During the focusing, the end point of the travel path of the lens is set to be the second position close to the far focus position, which reduces the travel movement of the lens, avoids the lens move to the far focus position, and then achieves a clear focusing on the face region.

In some embodiments, the acquiring module 420 includes the following.

A first determining unit 421, which is configured to determine whether the face region appears in the preview window.

A second determining unit 423, which is configured to determine whether the area of the face region is less than the preset value.

A acquiring unit 425, which is configured to acquire a preset travel path of the lens that matches with the face region when an area of the face region is less than a preset value, wherein a start point of the preset travel path is a first position, an end point of the preset travel path is a second position close to the far focus position, and the first position is not coincident with the second position.

Figure 5:
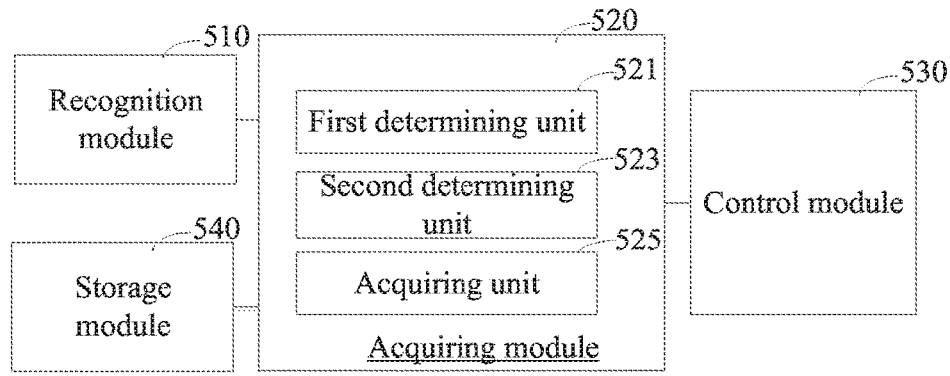
FIG. 5 is a structural block diagram of a focus control apparatus according to another some embodiments.

FIG. 5 is a structural block diagram of a focus control apparatus according to another some embodiments. In some embodiments, the focus control apparatus includes a recognition module 510, an acquiring module 520, a control module 530, and a storage module 540. The functions of the recognition module 510, the acquiring module 520, and the control module 530 are the same as those of the recognition module 410, the acquiring module 420, and the control module 430 in FIG. 4, and are not described herein again.

The storage module 540 is configured to store a default travel path of the lens input by a user, wherein a start point of the default travel path is the near focus position and an end point of the default travel path is the far focus position. The storage module 540 is further configured to store the preset travel path of the lens input by the user.

In some embodiments, the acquiring unit 525 in the acquiring module 520 is further configured to acquire the default travel path when the preview window does not have the face region, or the area of the face region in the preview window is greater than the preset value.

The division of each module in the above-described focus control apparatus is only for illustrative purposes. In other embodiments, the focus control apparatus may be divided into different modules as needed to complete all or part of the functions of the focus control apparatus.

Figure 6:
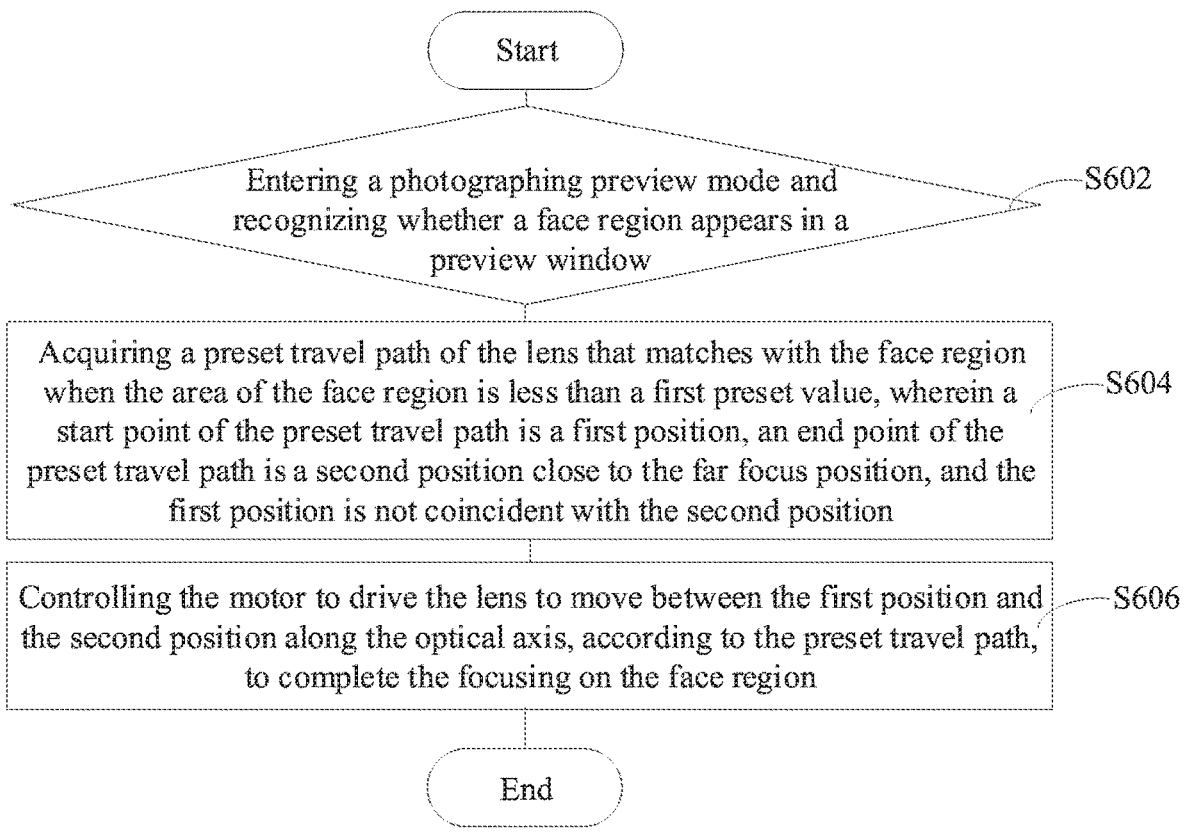
FIG. 6 is a flow chart of steps realized when computer programs (instructions) stored in a computer readable storage medium is executed by a processor according to some embodiments.

Embodiments of the present disclosure also provides a computer readable storage medium. FIG. 6 is a flowchart of steps realized when computer programs (instructions) stored in a computer readable storage medium is executed by a processor according to some embodiments. As shown in FIG. 6, a computer readable storage medium stores computer program. When the computer program is executed by a processor, the following blocks are implemented.

At block 602, the method enters a photographing preview mode and recognizes whether a face region appears in a preview window.

It should be noted that the method for focusing control according to embodiments of the present disclosure is implemented in a scenario where a photographing is performed in a mobile terminal. An imaging device of the mobile terminal is activated when the user wants to take a photograph. The imaging device includes a lens and a motor for driving the lens to move between a near focus position and a far focus position along an optical axis to achieve a focusing. In an initial state, the lens is at the near focus position, which means that a displacement of the lens is 0. During the focusing, the farthest position (relative to the near focus position) at which the motor drives the lens to move is the far focus position. When the lens is at the far focus position, a region having a distance of 5 meters or more from the lens of the imaging device can be focused by the imaging device. The imaging device can be a front camera, a rear camera, a dual camera, and the like.

The imaging device of the mobile terminal is activated and then enters the photographing preview mode, and a preset face recognition algorithm is used to recognize whether a face region exists in the preview window. For example, a geometric-feature-based manner, a local feature analysis manner, an eigenface (Eigenface or PCA) manner, an elastic-model-based manner, and a neural network (Neural Network) manner, or other manners that can recognize a face can be used.

At block 604, the method acquires a preset travel path of the lens that matches with the face region when the area of the face region is less than a first preset value, wherein a start point of the preset travel path is a first position, an end point of the preset travel path is a second position close to the far focus position, and the first position is not coincident with the second position.

With the face recognition algorithm, the face region is recognized to be in the preview window. The face region is a to-be-processed region which is outlined in a box, a circle, an ellipse, or an irregular polygon in a processed image in the machine vision and image processing. In a machine vision software such as Halcon, OpenCV, and Matlab, various operators and functions are commonly used to obtain the face region (which is also called ROI), and then a next processing of the image will be performed.

Specifically, in embodiments of the present disclosure, the face region is a to-be-processed region which is outlined in a box in the processed image.

Since the face region is the to-be-processed region which is outlined in a box in the processed image, the area of the face region and the first preset value may be compared. When the area of the face region is less than the first preset value, the preset travel path of the lens that matches with the face region is acquired, wherein a start point of the preset travel path is the first position, an end point of the preset travel path is the second position close to the far focus position, and the first position is not coincident with the second position. It can be understood that the linear distance of the preset travel path is a distance between the first position and the second position, and the second position is close to the far focus position (that is the second position has a distance from the far focus position and is not coincident with the far focus position).

In some embodiments, the preset travel path is pre-stored by the user in a corresponding configuration file. When the area of the face region that exists is less than the preset value, the pre-stored preset travel path is directly invoked.

At block 606, the method controls the motor to drive the lens to move between the first position and the second position along the optical axis, according to the preset travel path, to complete the focusing on the face region.

Since the object has a distance of 2 to 3 meters away from the imaging device, the lens in the imaging device is driven to be at the far focus position. However, by the above method, when the object is 2 to 3 meters away from the imaging device, the area of the face region that exists in the preview window will be less than the first preset value. At this time, according to the acquired preset travel path, the end point of the preset travel path is set to be the second position close to the far focus position. When the lens is at the second position, the imaging device can only focus on the object at about 2 to 3 meters, and the object can be accurately focused, making it clear.

In the above-mentioned computer readable storage medium, when the computer program (instruction) in the computer readable storage medium is executed, a preset travel path of the lens that matches with the face region is acquired when the area of the face region that exists is less than a preset value; wherein a start point of the preset travel path is a first position, an end point of the preset travel path is a second position close to the far focus position, and the first position is not coincident with the second position. The motor is controlled to drive the lens to move between the first position and the second position along the optical axis, according to the preset travel path, to complete the focusing on the face region. During the focusing, the end point of the travel path of the lens is set to be the second position close to the far focus position, which reduces the travel movement of the lens, avoids the lens move to the far focus position, and then achieves a clear focusing on the face region.

Figure 7:
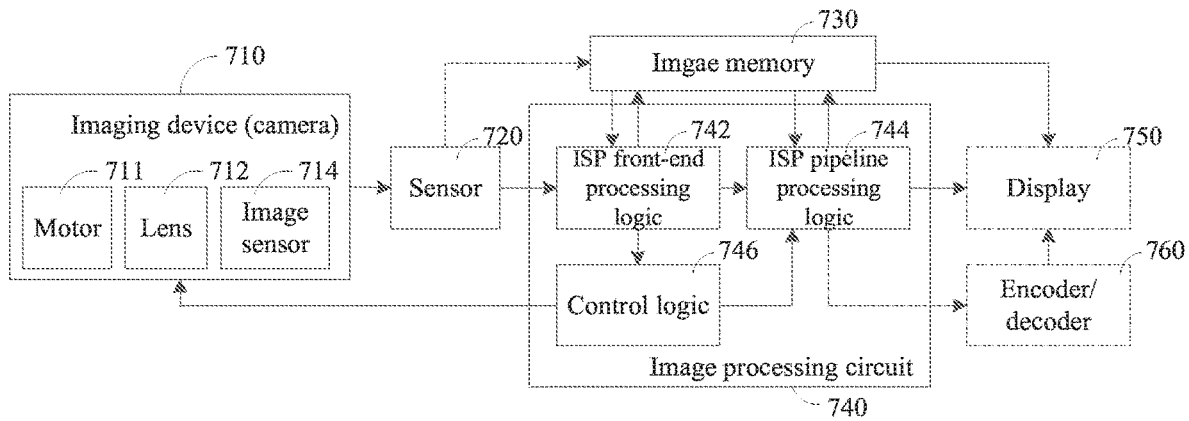
FIG. 7 is a schematic diagram of an image processing circuit according to some embodiments.
Figure 8:
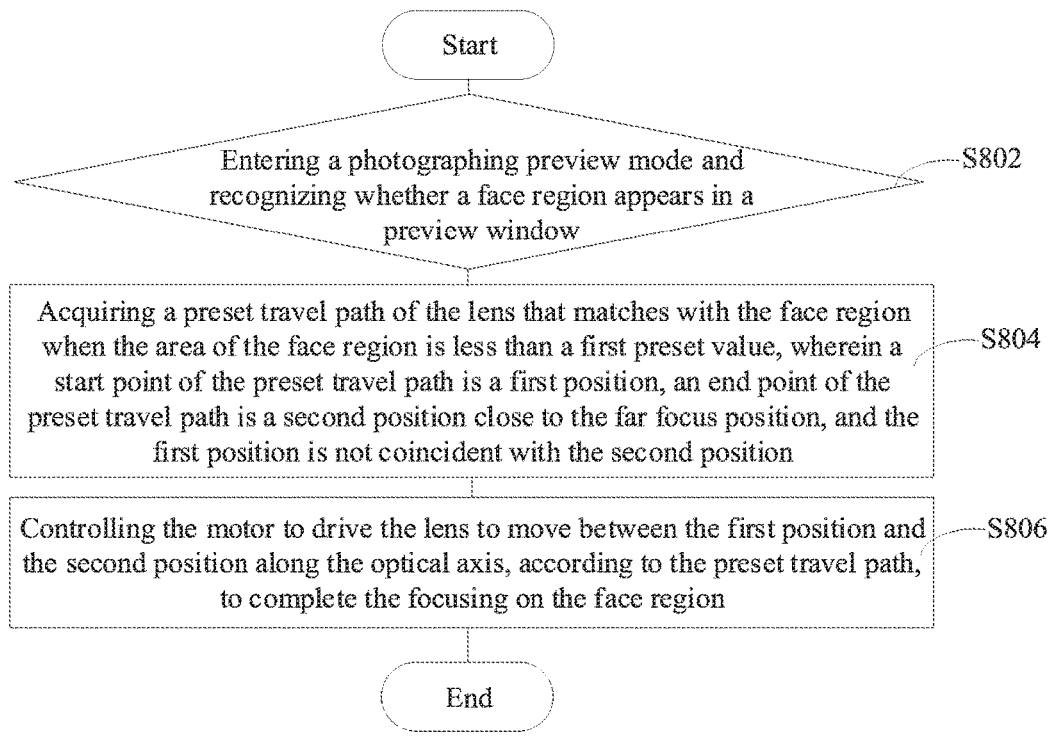
FIG. 8 is a flow chart of steps realized when a processor of a terminal executes a computer program according to some embodiments.

Embodiments of the present disclosure further provides a mobile terminal. The mobile terminal includes an imaging device, a processor, a non-transitory memory, a display, and a computer program stored in the memory and executable on the processor. The above mobile terminal further includes an image processing circuit, and the image processing circuit may be implemented by using hardware and/or software components, and may include various processing units defining ISP (Image Signal Processing) pipelines. FIG. 7 is a schematic diagram of an image processing circuit according to some embodiments. As shown in FIG. 7, in order to describe conveniently, only various aspects of the image processing technique related to embodiments of the present disclosure are shown.

As shown in FIG. 7, the image processing circuit 740 includes an ISP front-end processing logic 742, an ISP pipeline processing logic 744, and a control logic 746. The image data captured by an imaging device 710 is firstly processed by the ISP front-end processing logic 742. The ISP front-end processing logic 742 analyzes the image data to acquire image statistics information that may be used to determine one or more control parameters of the ISP pipeline processing logic 744 and/or the imaging device 710. The imaging device 710 may include a camera having one or more lenses 712 and an image sensor 714. The image sensor 714 may include a color filter array (such as a Bayer filter), the image sensor 714 may acquire light intensity and wavelength information captured by each imaging pixel of the image sensor 714, and provide a set of raw image data that can be processed by ISP front-end processing logic 742. For example, an interface of a sensor 720 receives the output of the imaging device 710, and provides raw image data to the ISP front-end processing logic 742 based on the interface type of the sensor 720. The interface of the sensor 720 may include a SMIA (Standard Mobile Imaging Architecture) interface, other serial or parallel camera interfaces, or a combination of the above.

The ISP front-end processing logic 742 processes the raw image data pixel by pixel in a variety of formats. For example, each image pixel can have a bit depth of 8, 10, 12, or 14 bits, and ISP front-end processing logic 742 can perform one or more image processing operations on the raw image data and collect statistical information about the image data. The image processing operations can be performed with the same or different bit depth precision.

The ISP front-end processing logic 742 can also receive pixel data from the image memory 730. For example, the raw pixel data is sent to the image memory 730 from the interface of the sensor 720. The raw pixel data in the image memory 730 is then provided to the ISP front-end processing logic 742 to be processed. The image memory 730 can be a part of a memory, a storage device, or a separate dedicated memory within an electronic device, and can have DMA (Direct Memory Access) feature.

When receiving the raw image data from the interface of the sensor 720 or from image memory 730, the ISP front-end processing logic 742 can perform one or more image processing operations, such as time domain filtering. The processed image data can be sent to ISP pipeline processing logic 744 or the image memory 730 to be performed additional processing before being displayed. The ISP pipeline processing logic 744 can also receive "front-end" processing data directly from the ISP front-end processing logic 742, or receive "front-end" processing data from the image memory 730, and perform image data processing for the "front-end" processing data in the original domain as well as RGB and YCbCr color space. The image data processed by the ISP pipeline processing logic 744 can be output to the display 750 for viewing by the user and/or further processed by a graphics engine or GPU (Graphics Processing Unit). In addition, the output of ISP pipeline processing logic 744 may also be sent to the image memory 730, and the display 750 may read the image data from image memory 730. In some embodiments, the image memory 730 can be configured to implement one or more frame buffers. Additionally, the output of ISP pipeline processing logic 744 can be sent to the encoder/decoder 760 to encode/decode image data. The encoded image data can be saved and decompressed before being displayed on the display 750.

The statistics data determined by the ISP front-end processing logic 742 can be sent to the control logic 746 unit. For example, the statistics data may include statistics information of the image sensor 714 such as auto exposure, auto white balance, auto focus, flicker detection, black level compensation, shading correction of the lens 712, and the like. The control logic 746 may include a processor and/or a microcontroller for performing one or more routines (such as firmware). The one or more routines determine the control parameters of the imaging device 710 and the ISP pipeline processing logic 744 according to the received statistical data. For example, the control parameters may include control parameters of the sensor 720 (eg, gain, integration time for exposure control), control parameters for camera flash, control parameters of the lens 712 (eg, focal length of focus or zoom), or a combination of these parameters. The ISP control parameters may include gain level and color correction matrix for automatic white balance and color adjustment (eg, during RGB processing), and parameters for shading correction of the lens 712.

The following are steps for implementing the method for focusing control based on the image processing technique in FIG. 7.

At block 802, the method enters a photographing preview mode and recognizes whether a face region appears in a preview window.

It should be noted that the method for focusing control according to embodiments of the present disclosure is implemented in a scenario where a photographing is performed in a mobile terminal. An imaging device of the mobile terminal is activated when the user wants to take a photograph. The imaging device includes a lens and a motor for driving the lens to move between a near focus position and a far focus position along an optical axis to achieve a focusing. In an initial state, the lens is at the near focus position, which means that a displacement of the lens is 0. During the focusing, the farthest position (relative to the near focus position) at which the motor drives the lens to move is the far focus position. When the lens is at the far focus position, a region having a distance of 5 meters or more from the lens of the imaging device can be focused by the imaging device. The imaging device can be a front camera, a rear camera, a dual camera, and the like.

The imaging device of the mobile terminal is activated and then enters the photographing preview mode, and a preset face recognition algorithm is used to recognize whether a face region exists in the preview window. For example, a geometric-feature-based manner, a local feature analysis manner, an eigenface (Eigenface or PCA) manner, an elastic-model-based manner, and a neural network (Neural Network) manner, or other manners that can recognize a face can be used.

At block 804, the method acquires a preset travel path of the lens that matches with the face region when the area of the face region is less than a first preset value, wherein a start point of the preset travel path is a first position, an end point of the preset travel path is a second position close to the far focus position, and the first position is not coincident with the second position.

With the face recognition algorithm, the face region is recognized to be in the preview window. The face region is a to-be-processed region which is outlined in a box, a circle, an ellipse, or an irregular polygon in a processed image in the machine vision and image processing. In a machine vision software such as Halcon, OpenCV, and Matlab, various operators and functions are commonly used to obtain the face region (which is also called ROI), and then a next processing of the image will be performed.

Specifically, in embodiments of the present disclosure, the face region is a to-be-processed region which is outlined in a box in the processed image.

Since the face region is the to-be-processed region which is outlined in a box in the processed image, the area of the face region and the first preset value may be compared. When the area of the face region is less than the first preset value, the preset travel path of the lens that matches with the face region is acquired, wherein a start point of the preset travel path is the first position, an end point of the preset travel path is the second position close to the far focus position, and the first position is not coincident with the second position. It can be understood that the linear distance of the preset travel path is a distance between the first position and the second position, and the second position is close to the far focus position (that is the second position has a distance from the far focus position and is not coincident with the far focus position).

In some embodiments, the preset travel path is pre-stored by the user in a corresponding configuration file. When the area of the face region that exists is less than the first preset value, the pre-stored preset travel path is directly invoked.

At block 806, the method controls the motor to drive the lens to move between the first position and the second position along the optical axis, according to the preset travel path, to complete the focusing on the face region.

Since the object has a distance of 2 to 3 meters away from the imaging device, the lens in the imaging device is driven to be at the far focus position. However, by the above method, when the object is 2 to 3 meters away from the imaging device, the area of the face region that exists in the preview window will be less than the first preset value. At this time, according to the acquired preset travel path, the end point of the preset travel path is set to be the second position close to the far focus position. When the lens is at the second position, the imaging device can only focus on the object at about 2 to 3 meters, and the object can be accurately focused, making it clear.

When the computer program (instruction) is executed by a processor, a preset travel path of the lens that matches with the face region is acquired when the area of the face region that exists is less than a preset value; wherein a start point of the preset travel path is a first position, an end point of the preset travel path is a second position close to the far focus position, and the first position is not coincident with the second position. The motor is controlled to drive the lens to move between the first position and the second position along the optical axis, according to the preset travel path, to complete the focusing on the face region. During the focusing, the end point of the travel path of the lens is set to be the second position close to the far focus position, which reduces the travel movement of the lens, avoids the lens move to the far focus position, and then achieves a clear focusing on the face region.

One of ordinary skilled in the art can understand that all or part of the process implementing the above embodiments can be completed by a computer program to instruct related hardware, and the program can be stored in a non-transitory computer readable storage medium. The program, when executed, may include flows of embodiments of the methods as described above. The storage medium may be a magnetic disk, an optical disk, read-only memory (ROM) and the like.

The above-mentioned embodiments are merely illustrative of several embodiments of the present disclosure, and the description thereof is more specific and detailed, but is not to be construed as limiting the scope of the claims. It should be noted that a number of variations and modifications may be made by those skilled in the art without departing from the spirit and scope of the present disclosure. Therefore, the scope of the present disclosure should be determined by the appended claims.

What is claimed is:

1. A method for focusing control, comprising:
recognizing whether a face region appears in a preview window in a photographing preview mode;
acquiring a preset travel path of the lens that matches with the face region in response to an area of the face region being less than a first preset value, wherein a start point of the preset travel path is a first position, an end point of the preset travel path is a second position close to a far focus position, and the first position is not coincident with the second position; and
focusing on the face region following the movement between the first position and the second position along the optical axis according to the preset travel path,
acquiring a default travel path in response to the face region not appearing in the preview window, wherein a start point of the default travel path is a near focus position and an end point of the default travel path is the far focus position; and
focusing on another object in the preview window following the movement between the near focus position and the far focus position according to the default travel path.

2. The method of claim 1, further comprising:
acquiring a number of pixels contained in the face region;
determining whether the number of pixels is less than a second preset value; and
determining the area of the face region is less than the first preset value in response to the number of pixels being less than the second preset value.

3. The method of claim 1, wherein the default travel path is prestored and input by a user.

4. The method of claim 1, wherein a distance between the first position and the near focus position is within a predetermined range, wherein the predetermined range is greater than or equal to zero.

5. The method of claim 1, wherein the preset travel path is prestored and input by a user.

6. The method of claim 1, wherein a linear distance of the preset travel path is a distance between the first position and the second position.

7. The method of claim 1, wherein
a displacement of the lens is zero in response to the lens being located at the near focus position; and
the imaging device is enabled to focus on a region having a distance of 5 meters or more from the lens in response to the lens being located at the far focus position.

8. The method of claim 1, wherein whether the face region appears in the preview window is recognized by a preset face recognition algorithm.

9. The method of claim 8, wherein the preset face recognition algorithm comprises one of a geometric-feature-based manner, a local feature analysis manner, an eigenface manner, an elastic-model-based manner, and a neural network manner.

10. The method of claim 1, wherein the face region is a to-be-processed region which is outlined in a box, a circle, an ellipse, or an irregular polygon in a processed image.

11. The method of claim 1, wherein a Contrast Detection Auto Focus (CDAF) is utilized to complete the focusing on the face region.

12. A mobile terminal comprising:
a non-transitory memory storing one or more programs, a processor, and an imaging device, wherein the imaging device comprises a lens and a motor configured to drive the lens to move between a near focus position and a far focus position along an optical axis to achieve a focus function, and wherein the one or more programs are configured to be executed by the processor to perform a method for focusing control, and the method comprises:
recognizing whether a face region appears in a preview window in a photographing preview mode;
acquiring a preset travel path of the lens that matches with the face region in response to an area of the face region being less than a first preset value, wherein a start point of the preset travel path is a first position, an end point of the preset travel path is a second position close to the far focus position, and the first position is not coincident with the second position; and
controlling the motor to drive the lens to move between the first position and the second position along the optical axis according to the preset travel path to focus on the face region,
wherein the motor is controlled to drive the lens to move according to a default travel path to focus another object in the preview window in response to the face region not appearing in the preview window, wherein a starting point of the default travel path is the near focus position and an end point of the default travel path is the far focus position.

13. The mobile terminal of claim 12, wherein when a number of pixels contained in the face region is less than a second preset value, the area of the face region is less than the first preset value.

14. The mobile terminal of claim 12, wherein a distance between the first position and the near focus position is within a predetermined range, wherein the predetermined range is greater than or equal to zero.

15. The mobile terminal of claim 12, wherein a displacement of the lens is zero in response to the lens being located at the near focus position; and
the imaging device has an ability to focus on a region having a distance of 5 meters or more from the lens in response to the lens being located at the far focus position.

16. The mobile terminal of claim 12, wherein whether the face region appears in the preview window is recognized by a preset face recognition algorithm, and the preset face recognition algorithm comprises one of a geometric-feature-based manner, a local feature analysis manner, an eigenface manner, an elastic-model-based manner, and a neural network manner.

17. The mobile terminal of claim 12, wherein a Contrast Detection Auto Focus (CDAF) is utilized to complete the focusing function on the face region.

18. A non-transitory storage medium storing one or more programs, when executed by a processor, causing the processor to perform a method for focusing control, wherein the method comprises:
recognizing whether a face region appears in a preview window in a photographing preview mode;
acquiring a preset travel path of the lens that matches with the face region in response to an area of the face region being less than a first preset value, wherein a start point of the preset travel path is a first position, an end point of the preset travel path is a second position close to a far focus position, and the first position is not coincident with the second position; and
focusing on the face region following the movement between the first position and the second position along the optical axis according to the preset travel path,
acquiring a default travel path in response to the face region not appearing in the preview window, wherein a start point of the default travel path is a near focus position and an end point of the default travel path is the far focus position; and
focusing on another object in the preview window following the movement between the near focus position and the far focus position according to the default travel path.

* * * * *